Sept. 27, 1966 E. J. SCHNEBERGER 3,275,991

MEMORY SYSTEM

Filed Dec. 3, 1962 4 Sheets-Sheet 1

INVENTOR.
EDWARD J. SCHNEBERGER
BY Arthur Freilich
ATTORNEY

Sept. 27, 1966 E. J. SCHNEBERGER 3,275,991

MEMORY SYSTEM

Filed Dec. 3, 1962 4 Sheets-Sheet 2

INVENTOR
EDWARD J. SCHNEBERGER
BY Arthur Freilich
ATTORNEY

MEMORY SYSTEM

Filed Dec. 3, 1962 4 Sheets-Sheet 3

INVENTOR.
EDWARD J. SCHNEBERGER
BY Arthur Freilich
ATTORNEY

INVENTOR
EDWARD J. SCHNEBERGER
BY Arthur Freilich
ATTORNEY 3,275,991
Patented Sept. 27, 1966

3,275,991

MEMORY SYSTEM

Edward J. Schneberger, Canoga Park, Calif., assignor, by mesne assignments, to The Bunker-Ramo Corporation, Stamford, Conn., a corporation of Delaware Filed Dec. 3, 1962, Ser. No. 241,597
11 Claims. (Cl. 340—172.5)

This invention relates generally to digital data processing apparatus, including digital computers, and more particularly to improvements in memory systems for use in such apparatus.

In evaluating the capabilities of data processing apparatus, one of the prime factors to be considered is the capacity of the memory and the time required to access information therefrom. On the one hand, it is desirable to have access to a maximum amount of information and on the other hand, it is desirable to have access to this information in the shortest possible time. Accordingly, much effort has been expended in the development of high speed memory elements and as a result sophisticated devices such as tunnel diodes, thin films, and cryotrons have been made available. Contrasted with the microsecond switching time of magnetic devices, these newer elements can be switched in time in the nanosecond range. However, although the switching speed of the individual element has been increased one thousandfold, the memory cycle times of practical memories using these elements has not been reduced proportionately since the speed of the memory is additionally limited by the size and speed of the interconnecting networks and not solely by the speed of the elements themselves. Accordingly, although definitely reduced access times can be achieved by using faster switching elements, the reduction is not as great as might be initially expected.

In addition to the speed and size aspects which must be considered in the design of a memory system, ever present cost considerations dictate that the equipment be capable of being produced as inexpensively as possible. It should be readily appreciated that speed, size, and cost considerations are not independent and from a design standpoint cannot be independently optimized. For example, generally the fastest memory elements available for practical use in large memory arrays are also the most expensive. Accordingly, although a large scale memory could be made entirely of, e.g., tunnel diodes, the cost of such a memory might prove prohibitive. Therefore, a desirable design objective is to limit the size of extremely high-speed memories.

In view of the foregoing considerations, recent attempts have been made to provide data processing apparatus with memory systems including a hierarchy of memories such as a relatively small and very fast memory consisting of expensive memory elements backed up by larger and slower memories consisting of less expensive elements. A hierarchy type memory system generally represents an optimum compromise between size, speed and cost considerations. Some such exemplary hierarchy memory systems might utilize the following type memory combinations:

| Fast | Medium | Slow |
|---|---|---|
| 1. Cores | Drums | Tapes. |
| 2. Word Selected Cores | Coincident Selected Cores | Drums. |
| 3. Cryotrons | Cores | Tapes. |
| 4. Tunnel Diodes | Cores | Drums. |
| 5. Flip-Flops | Cores | Tapes. |

One of the significant problems associated with the utilization of a hierarchy of memories is the moving of data and programs between the various memories. The movement is necessary because the arithmetic unit or main frame of the computer or data processing apparatus should generallly obtain its program and operands from the fastest memory available in order to most efficiently utilize its time. In presently employed apparatus utilizing a hierarchy of memories, it has proved to be a tedious and time consuming procedure to sequentially move information from the slow memory up to the memory from which it is ultimately used. That this has been recognized is apparent from the considerable effort and ingenuity which has been dedicated to the development of systems which obtain new data from memory while previously obtained data is operated on. These newly developed techniques range from car to tape transcribers through magnetic tape searching and buffering devices and up to the various look-ahead techniques employed to obtain data from core memories.

Even with the use of these newly developed techniques, the movement of data between memories represents a considerable programming burden and time consuming procedure. Additionally, at present the methods of employing extremely high speed "scratch pad" memories are quite restrictive. They are generally treated as extensions of the register capacity of data processing apparatus and are used primarily for index words, automatic interrupt addresses, intermediate computational results, and for commonly used constants or formats. Very few of the data processing systems presently available are large enough and fast enough to permit the execution of subroutines from the high-speed memory and practically no systems are available in which it is feasible to execute portions of the main program from such a memory.

Inasmuch as the overall speed of data processing apparatus is generally limited by its memory access time, it can be readily appreciated that the overall speed can be significantly increased if a significantly greater proportion of information is accessed from the fastest memory available. In other words the increase in overall speed that can be obtained by using an extremely fast memory is proportional both to the speed of that memory and the frequency of its use. It is often the case that the frequency of use is so low that the performance gain obtained by doubling the speed of the high-speed memory is almost negligible. However, effort expended in increasing the relative frequency of use can be quite rewarding.

In the light of the above, it is an object of this invention to provide an improved memory system for use in data processing apparatus which includes a hierarchy of memories and which is organized and operated so as to assure a maximum utilization of the fastest memory of the memory system.

It is an additional object of the present invention to provide a memory system including a hierarchy of memories which possess the advantages of prior art hierarchy type memory systems, i.e., an optimum compromise between size, speed and cost considerations and which avoids the necessity of programming transfers of information between the memories.

It is still an additional object of the present invention to provide a memory system in which more information can be accessed in a shorter amount of time than has been possible in heretofore known memory systems at a comparable cost.

Briefly, the invention herein comprises the provision, in a memory system having a hierarchy of memories including a smaller extremely fast memory and larger slower memories, of addressing means common to all of said memories together with means for automatically loading said fast memory from said larger memories in accordance with some logical criteria in order to permit the greatest percentage of memory accesses to be made from said fast memory.

In accordance with the invention, the embodiment illustrated herein employs an extremely fast content addressable memory associated with a small extremely fast conventional memory which acts in combination with a much larger and slower conventional main memory. (It might be appropriate to here point out that a content addressable memory has properties enabling all the words stored therein to be searched simultaneously to determine the presence and location of known information in one access time. Such a memory is disclosed in U.S. Patent No. 3,031,650 issued on April 24, 1962 to Ralph J. Koerner.) Each location in the fast memory stores the contents of one location in the main memory. One content addressable memory location is associated with each location in the fast memory and in an address table portion thereof stores the address of the main memory location in which the contents of the associated fast memory location is stored. A second portion of the content addressable memory will be referred to as the value table and also includes one memory location associated with each location in the fast memory. The value table associates a value or priority number with each word in the fast memory, the value number being utilized by appropriate logic circuits to determine priorities when certain words in the fast memory have to be displaced by words from the main memory.

In operation, an external device, such as the arithmetic unit of a computer, loads a main memory address into an address register which normally serves to select a main memory location. Subsequently, the content addressable memory address table is searched to determine if the address appears therein. It will be recalled that a content addressable memory can be searched for the presence of known information in one access time. If the address is located in the content addressable memory, the word line associated with the location storing that address will be energized and this action in turn is utilized to read out the contents of the associated location in the fast memory. If, on the other hand, the address is not found in the content addressable memory, then the main memory is accessed in a conventional manner to cause the word in the addressed location to be read out. Additionally, the word read out from the main memory is read into the fast memory and simultaneously the address of the location in which the information is stored in the main memory is inserted in the content addressable memory address table in the location associated with that in which the word is stored in the fast memory. Inasmuch as the capacity of the fast memory is much smaller than the main memory, it will be realized that after several memory accesses are made, the fast memory will be full and in order to store further words therein, previously stored words have to be displaced. In order to determine which words should be displaced, a value or priority number is associated with each fast memory location and is stored in the value portion of the content addressable memory. Use of a value number system assures that the words most likely to be accessed are stored in the fast memory. The value number system detailed herein makes use of a unique number for each word in the fast memory; i.e., if for example the capacity of the fast memory is 50 words, a unique value number between 1 and 50 would be associated with each of the words in the fast memory.

A simple but useful criteria for controlling the value numbers is to give a word a value number of 50 when it is initially placed in the fast memory and then incrementally reduce it by one whenever (a) a word is accessed from the main memory and consequently loaded into the fast memory, or (b) a word having a lower value number is accessed from the fast memory. The value number is restored to 50 whenever the word itself is accessed. When the fast memory is full and a new word need be inserted therein, the word with the lowest value number is displaced. Accordingly, if a particular word is placed in the fast memory and then not utilized while a total of 50 words consisting of those brought from the main memory and those having lower value numbers accessed from the fast memory are given a value number of 50, it will be removed from the fast memory. On the other hand, if while in the fast memory it is accessed, its value number would be raised to 50 and its incremental reduction would begin over again. This method of controlling the value numbers may be referred to as a gravity feed method and is based upon the recognition that once a word is accessed, the likelihood that it will be accessed again within the next several accesses is greater than that of memory words not previously accessed. That this criteria has considerable merit is readily apparent when the number of iterations or tight loops performed in usual data processing and computing tasks, is realized.

Although the embodiment of the invention illustrated herein shows only the details of implementation of the gravity feed criteria, the use of more complex criteria should become readily apparent. For example, means could be provided enabling the value numbers to be modified in accordance with the use of the associated word over the past several hundred accesses rather than over the past 50 or so accesses regardless of what the storage capacity of the fast memory happens to be.

Additional objects and advantages will subsequently become apparent which reside in the details of circuitry and operation as more fully hereinafter described and claimed, further reference being made to the accompanying drawings forming a part hereof, wherein like identifying numerals refer to like parts throughout the several figures and in which:

Figure 3:
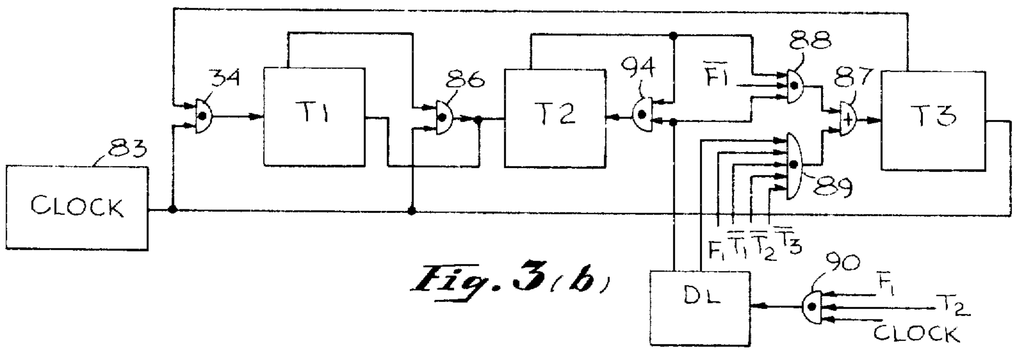
Figure 3:
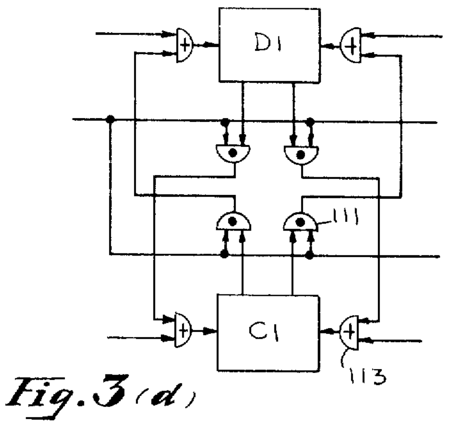
Figure 3:
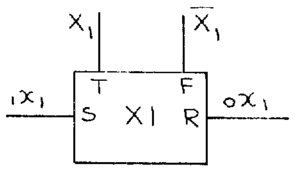
Figure 3C:
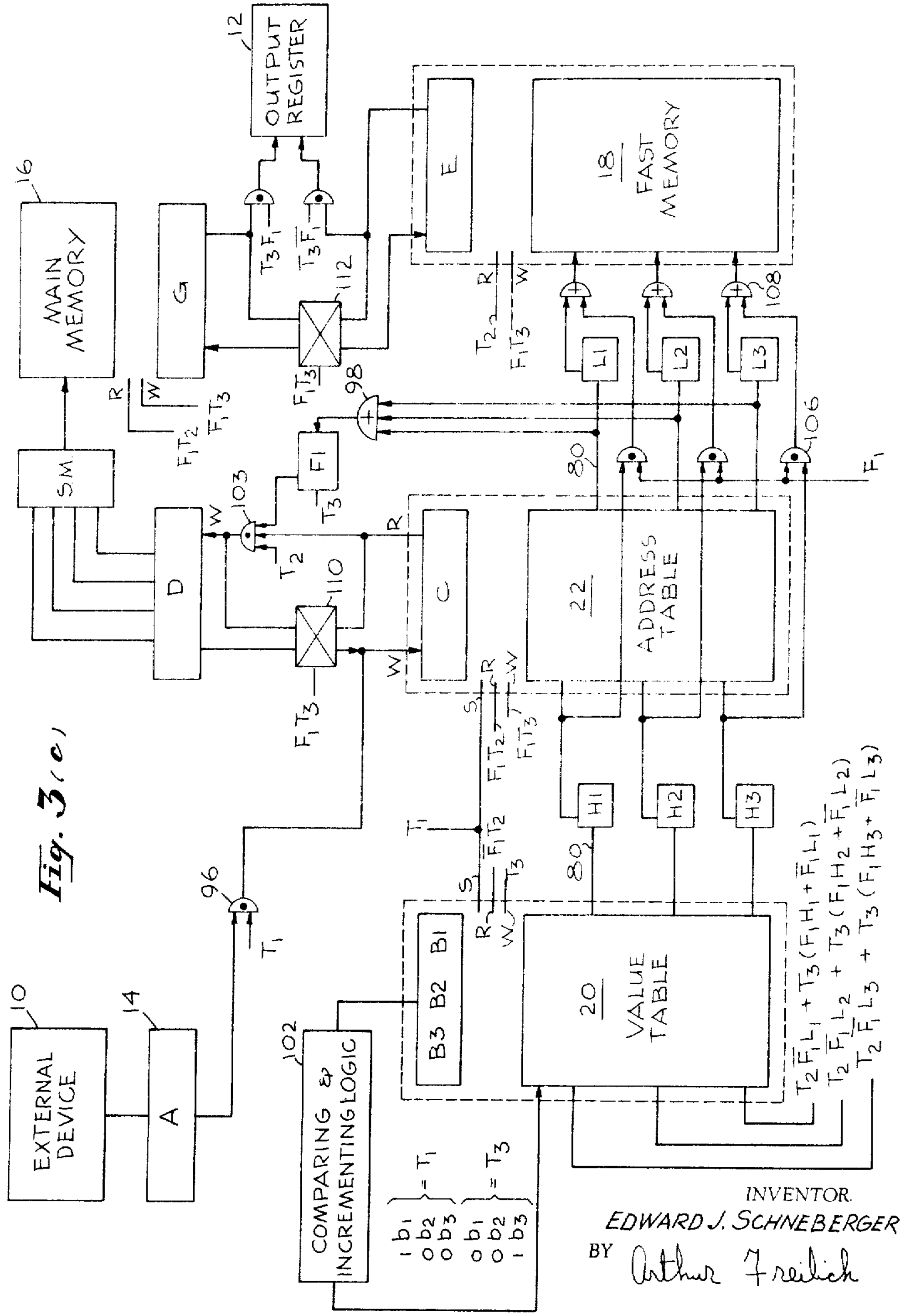
Figure 4:
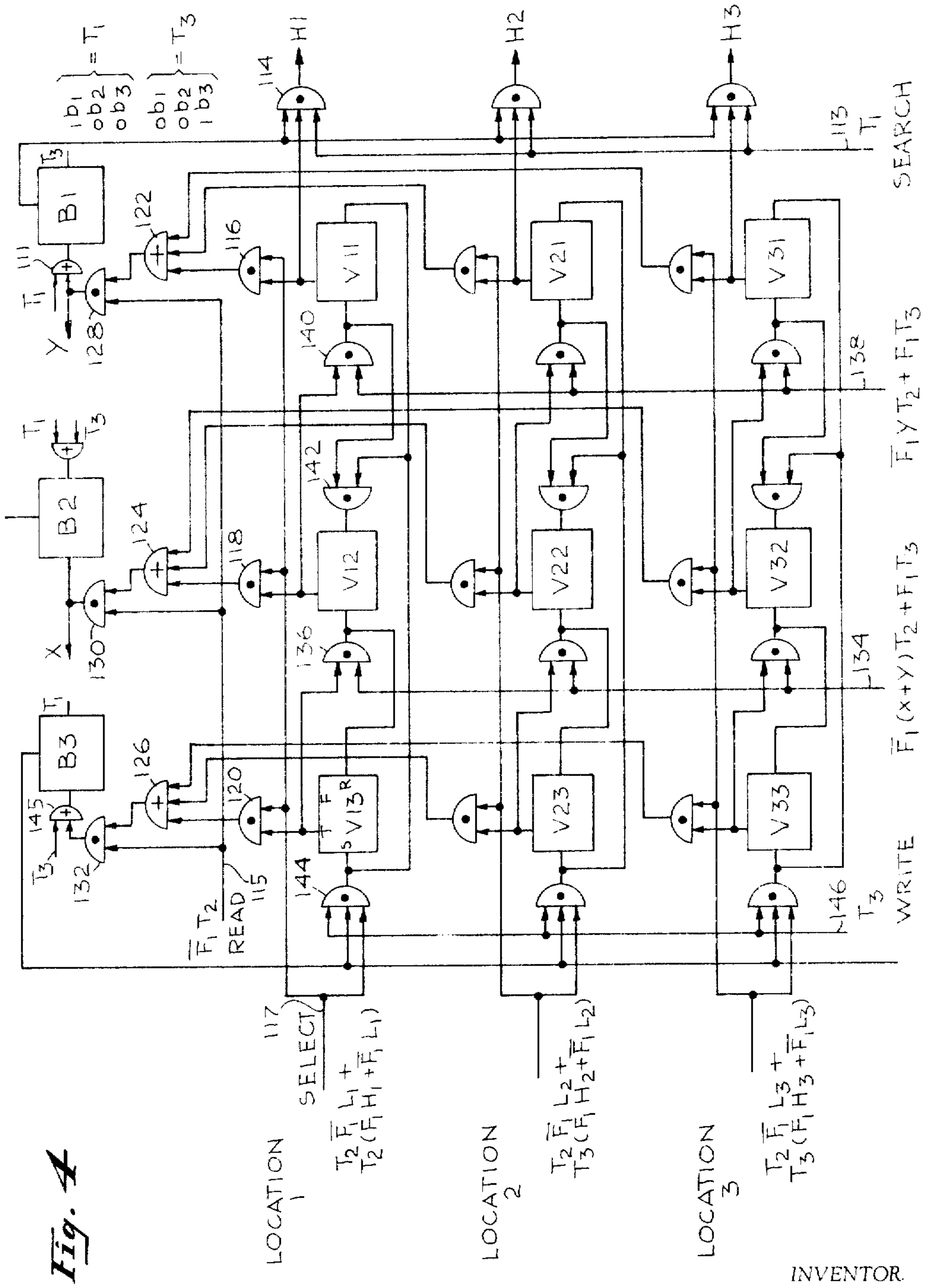

FIG. 3(*a*) is a schematic diagram of a flip-flop shown to introduce the nomenclature utilized in later figures, FIG. 3(*b*) is a schematic diagram of a counter circuit utilized to provide the timing signals required by the apparatus of FIG. 3(*c*), FIG. 3(c) is a schematic diagram illustrating in detail a memory system embodying the invention disclosed herein, and FIG. 3(d) is a schematic diagram of exchange means utilized in FIG. 3(c) for exchanging information between registers; and FIG. 4 is a schematic diagram showing the details of one embodiment of the value table of FIG. 3(c).

Figure 1A:
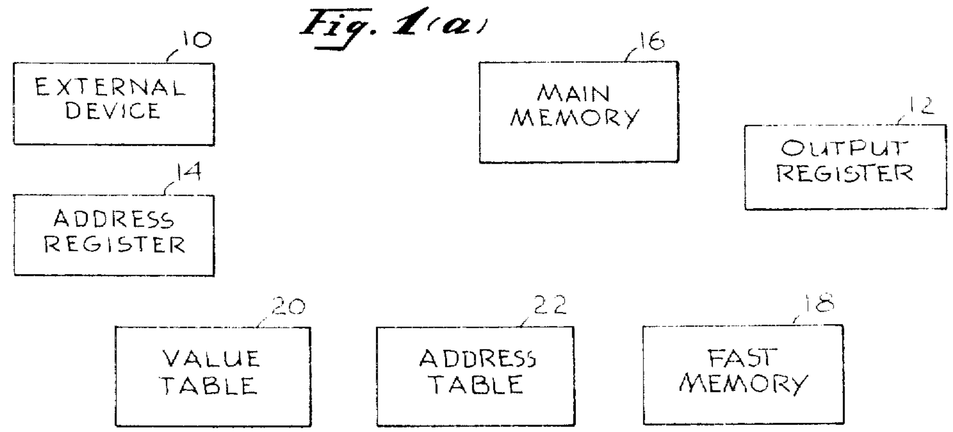
FIGURE 1(*a*) is a block diagram illustrating the more significant portions of the memory system described in detail in FIG. 3(*c*) and FIG. 1(*b*) is a flow diagram generally illustrating the functional operation of the memory system.
Figure 1B:
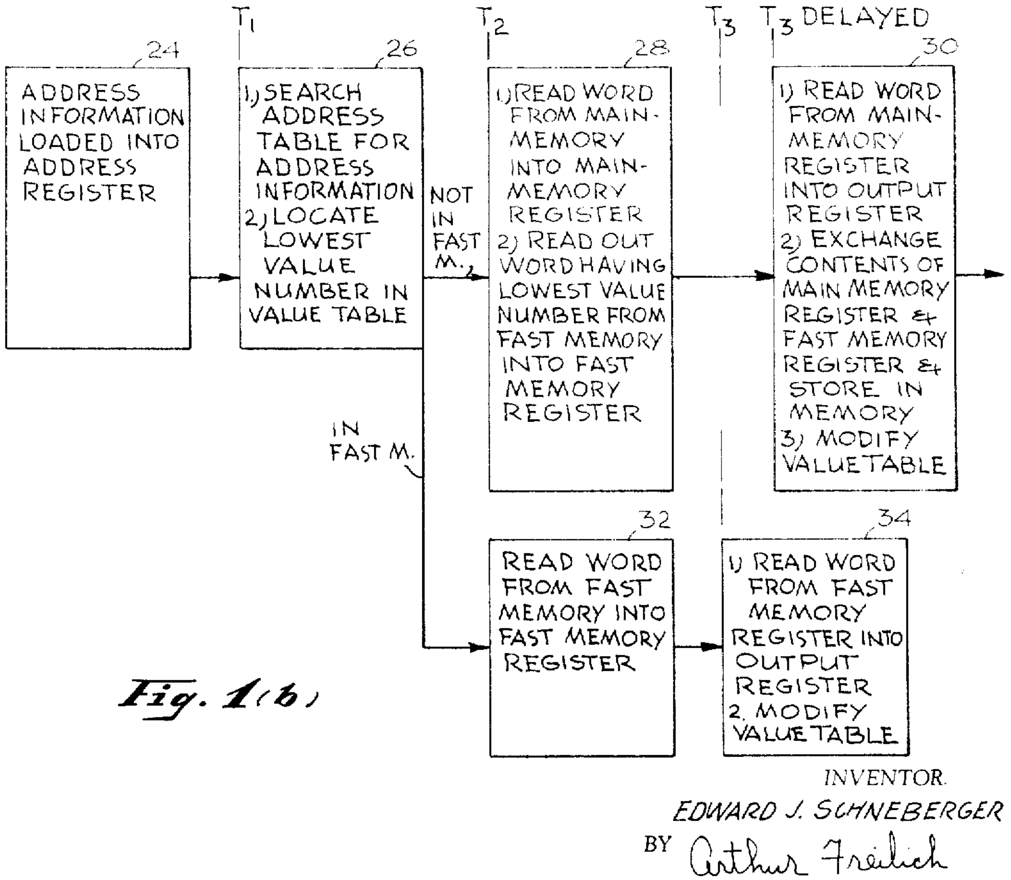

With continuing reference to the drawings, initial attention is called to FIG. 1(*a*) wherein the block 10 labeled "external device" can comprise the arithmetic unit of a computer or some other unit in a data processing system which is capable of addressing the memory of the system in order to cause the information stored in the addressed location to be read out into the output register 12. As previously pointed out, it is desirable to be able to access from the memory as much information in as short a time as possible. "Accessing" information from the memory means causing the information stored in the location addressed by the external device to be read out into the output register 12. "Addressing" by the external device 10 contemplates loading address information into the address register 14 which identifies a storage location in main memory 16 in which is stored the information desired to be read out into the output register 12.

Although it is desirable that the memory have infinite capacity and that access times be reduced to zero, such is, of course, not possible. Moreover, cost considerations play a major role in determining the type of memory to be utilized in practical data processing systems. The design objective generally desired for a practical data processing system are to provide an amount of storage capacity above a certain required minimum accessible in an amount of time less than a certain required maximum at a cost less than a predetermined maximum. Inasmuch as the fastest memory elements generally available are also the most expensive, recent use has been made of a small fast memory 18 acting together with the large main memory 16 to arrive at a design compromise by attempting to permit the external device 10 to access most of its information from the fast memory while still enabling the apparatus to be produced at a reasonable cost. It can be appreciated that the advantages obtained by utilizing the small fast memory 18 in conjunction with the large main memory 16 are proportional to the frequency of use of the fast memory 18. The relationship between the speeds of the memories 16 and 18 is, of course, dependent upon their respective organizations and the memory elements used therein. In a practical situation, the ratio of the main memory access time to the fast memory access time could be 50:1 as where a coincident current magnetic core type main memory is utilized together with a word organized tunnel diode fast memory. More particularly, a reasonable access time for such a main memory might be 5 microseconds while a reasonable access time for such a fast memory might be .1 microsecond. The relative storage capacity of the main and fast memories in a practical system would, of course, depend upon the contemplated uses of the system. Primarily, experience has indicated that significant advantages can be obtained in a general purpose computer with as wide a variation as 16–2048 fast memory locations and upwards of 8,192 main memory locations.

As pointed out, the invention herein functions to increase the frequency of use of the fast memory 18 to thereby increase the overall average access time of the memory system. Broadly, increased frequency usage of the fast memory 18 is accomplished by providing a pair of additional fast memories 20 and 22, respectively, labeled "value table" and "address table." In addition to memories 20 and 22 being extremely fast, it is intended that they be of the content addressable type thereby permitting all of the locations therein to be searched simultaneously to determine whether or not a match exists between the contents of any location and information held in a search register associated with the content addressable memory. The value table 20 and address table 22 each has a number of storage locations equal to the number of storage locations in the fast memory 18. More particularly, each location in the fast memory 18 has associated therewith a unique location in the value table 20 and the address table 22.

Attention is now called to FIG. 1(*b*) wherein is presented a flow diagram which should facilitate a general understanding of the block diagram of FIG. 1(*a*). Block 24 represents the initial step in a memory access and comprises loading the address information generated by external device 10 into the address register 14.

The second step, occurring at time $T_1$, in the access procedure is represented by block 26 and comprises searching the address table 22 to determine whether or not the information previously loaded into the address register 14 appears therein. If the address is found in the address table 22, it means that the desired word is stored in the fast memory 18. If, on the other hand, the address is not found in address table 22, it means that the desired word must be accessed from the main memory 16.

Associated with each location in the fast memory 18 is a unique location in the value table 20 which stores a value number representing the value or priority of the associated word in the fast memory 18. Inasmuch as the capacity of the fast memory 18 is limited, only a portion of the capacity of the main memory 16 can be stored in the fast memory 18. The value numbers stored in the value table 20 provide a means by which the value of the word in the fast memory 18 can be measured in order to determine which word to displace from the fast memory 18 when the fast memory 18 is full and a word of greater value is to be brought from the main memory 16 and loaded into the fast memory 18. Accordingly, in block 26 the value table 20 is searched simultaneously with address table 22. As pointed out, the address table 22 is searched to locate an address matching the address in address register 14. The value table 20 is searched to locate the lowest value number and thereby the word in the fast memory 18 which has the least value and is the most expendable.

Assuming initially that the address in address register 14 is not located in address table 22, the third step occurring at time $T_2$, in the access procedure is represented by block 28 and comprises reading out the word from the main memory location identified by the address into the main memory register. Simultaneously, the located lowest valued word is read out of the fast memory 18 into the fast memory register. Subsequently, at time $T_3$, in block 30, the word accessed from the main memory 16 is read into the output register 12 and into the fast memory location formerly occupied by the lowest valued word while the word read out from that fast memory location is read into the main memory location from which it had been originally accessed. In addition to the new word from the main memory being read into the fast memory, the address identifying the main memory location from which the new word was accessed is written into address table 22 in the location associated with the fast memory location in which the new word is stored. Additionally, a value number of the highest order is written into the value table location associated with the fast memory location in which the new word is stored and all other value numbers in the value table 20 are incrementally reduced by one.

If, on the other hand, the address had been located in address table 22 when it had been searched at time $T_1$ during the step designated by block 26, the word associated therewith in the fast memory 18 would have been read out at time $T_2$ into the fast memory register as represented by block 32. Subsequently, at time $T_3$, the word in the fast memory register would have been read into output register 12 and the value number associated with that word would have been raised to that of the highest order and all value numbers previously above it would have been incrementally reduced by one. This latter step is represented by block 34. Although, it will be noted, that regardless of whether or not the desired word is in the fast memory 18, it will not be read into the output register 12 until time $T_3$. As will be seen below, time $T_3$ will occur at a much earlier time when the word is in the fast memory 18. Inasmuch as information read out from the fast memory 18 is available in the output register 12 in about 1/50 of the time it required information to be read out from the main memory 16, assuming the relative access times previously mentioned, it should be readily appreciated that the more the fast memory 18 is accessed, the greater the overall speed of the apparatus. In other words, it is desirable to be able to perform the step represented by block 32 after the step represented by block 26 as often as possible.

Figure 2:
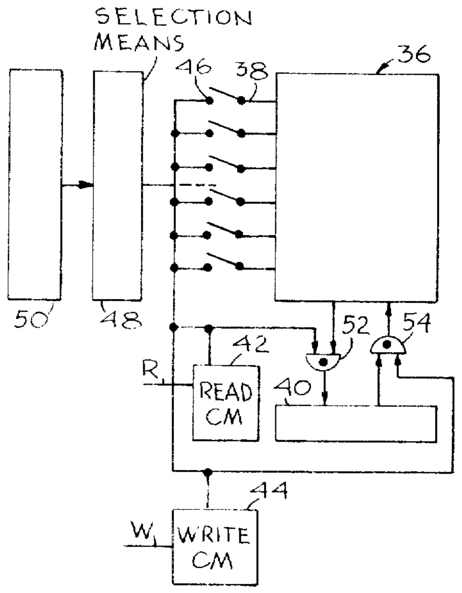
FIG. 2(*a*) is a schematic diagram of a conventional memory and FIG. 2(*b*) is a schematic diagram of a content addressable type memory.
Figure 2:
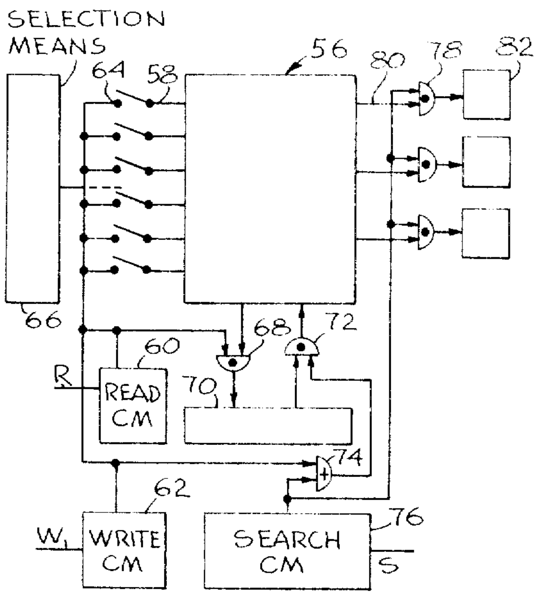

Attention is now called to FIG. 2(*a*) wherein a conventional memory is schematically illustrated for the purpose of facilitating an understanding of FIG. 3(*c*). Inasmuch as the memory is conventional and is readily taught in the prior art, its detailed implementation is not herein illustrated. Generally, the memory comprises a memory element array 36 which can, for example, consist of commercially available magnetic core stacks. A word select line 38 can be threaded through the cores of each memory location in order to drive the cores to enable information to be read out therefrom into register 40 or written therein from register 40. Whether information is written into the cores of a memory location or read out therefrom depends upon whether a read control means 42 or a write control means 44 is energized. A signal applied to input line R energizes read control means 42 while a signal applied to input line W energizes write control means 44. The output line of each of the read and write control means 42 and 44 is illustrated as connected to the word select lines 38 through toggle switches 46. The toggle switches are in turn controlled by a selection means 48 which acts in response to address information stored in an address register 50. Additionally, an AND gate 52 controlled by the output of read control means 42 couples the memory elements in array 36 to the register 40. Similarly, AND gate 54 controlled by the output of write control means 44 couples the output of register 40 to the memory elements of array 36. In operation, an address is loaded into the address register 50. The selection means 48 functions as, e.g., by coincident current or word selection, to decode the address and in response thereto closes one of the toggle switches 46. Energization of the read or write control means then functions to cause information to be read out from or written into the memory elements associated with the word select line 38 connected to the closed toggle switch. As indicated, various memory implementations of this general type are illustrated in the prior art. One such memory is disclosed in U.S. application for patent, Serial No. 214,227, "Word Selection Technique" by P. E. Wells and A. D. Scarbrough, filed on August 2, 1962.

Attention is now directed to FIG. 2(*b*) wherein a content addressable memory is schematically illustrated. Again, the content addressable memory of FIG. 2(*b*) is described in the prior art and introduced here only to facilitate an understanding of FIG. 3(*c*). As pointed out, a content addressable memory has the property enabling all of its locations to be simultaneously searched for identity with a word stored in a search register. The content addressable memory includes an array of the memory elements 56 which can be arranged so that each memory element comprises a unique bit of a single memory location. Each of the memory locations in the array 56 is uniquely associated with one of the word select lines 58. A read control means 60 and a write control means 62 are connected to the word select lines 58 through toggle switches 64. The toggle switches 64 are in turn controlled by selection means 66. An AND gate 68 couples the memory elements array 56 to a register 70 and is controlled by the output of read control means 60. An AND gate 72 couples the output lines of the register 70 to the memory elements of the array 56 and is controlled by the output of OR gate 74. The inputs to OR gate 74 respectively comprises the output of write control means 62 and the output of search control means 76. The output of search control means 76 controls AND gates 78 each of which has a unique word match line 80 connected thereto. Each of the word match lines 80 is associated with the memory elements of one memory location. The outputs of AND gate 78 are connected to the inputs of conventional set-reset flip-flops. Signals applied to input lines R, W, and S respectively energize read, write, and search control means 60, 62 and 76.

In operation, if it is desired to search the contents of array 56 to determine whether the contents of any of the memory locations therein match the information stored in register 70, the search control means 76 is energized causing signals to be generated through the array 56. A match condition between the contents of any of the locations and the contents of register 70 will result in the energization of the word match line 80 associated with that location. As a consequence, the flip-flop 82 connected to the word line 80 by AND gate 78 will be set to indicate the match condition. If it is desired to then read information from the memory elements of that location or write information therein, the output of the set flip-flop can be coupled back to the selection means 66 to cause the toggle switch 64 connected to the word select line 58 associated with that location to close. The read or write control means 62 can be independently energized to drive a signal along the word select line 58 so as to cause the information in register 70 to be written into the memory elements associated therewith or the information stored in the memory elements to be read out into the register 70. Again, it is pointed out that prior art content addressable memories are available which operate in the manner described. One such memory apparatus is described in U.S. Patent No. 3,031,650 "Memory Array Searching System" granted to Ralph J. Koerner on April 24, 1962.

Attention is now called to FIG. 3(*a*) wherein a conventional set-reset flip-flop is schematically illustrated for the purpose of introducing the nomenclature which will be utilized throughout the remainder of the specification. If the flip-flop be identified as X1, then the output signal representing the true or set condition of the flip-flop will be indicated as $X_1$ and its complement, the false or set condition, as $\overline{X_1}$. The input signal applied to the set input terminal to cause the flip-flop to assume a true state will be represented by ${}_1x_1$ and the input signal applied to the reset input terminal serving to cause the flip-flop to assume a false state will be referred to as ${}_0x_1$. This nomenclature will be utilized in any logical equations hereinafter employed. Logical equations will be introduced in situations where it is thought that their presence will facilitate an understanding of the description.

Attention is now called to FIG. 3(*b*) wherein the counter circuit illustrated is utilized to provide timing signals required for the operation of the memory system detailed in FIG. 3(*c*). As will become more apparent below, three discrete timing signals are employed in the performance of the access operation in the illustrated embodiment of the invention. The counter is provided with three set-reset flip-flops respectively designated T1, T2, and T3 which when set respectively provide timing signals $T_1$, $T_2$, and $T_3$. Additionally, a monostable circuit DL is provided which is stable in a set condition but which upon the application of a reset pulse thereto assumes a reset condition for 5$\mu$ seconds. A clock pulse source 83 is provided which in accordance with the exemplary operating speeds of the main memory 16 and fast memory 18 pointed out previously; i.e., 5$\mu$ seconds and .1$\mu$ second, respectively, provides a clock pulse every .1$\mu$ second. AND gates 84 and 86 are respectively connected to the set input terminals of flip-flops T1 and T2. The input terminals of AND gate 84 are respectively connected to the true output terminal of flip-flop T3 and clock 83 while the input terminals of AND gate 86 are respectively connected to the true output terminal of flip-flop T1 and clock 83. The outputs of gates 84 and 86 are additionally connected to the reset input terminals of flip-flops T3 and T1, respectively.

OR gate 87 is connected to the set input terminal of flip-flop T3. The outputs of AND gates 88 and 89 are connected to the input terminals of OR gate 87. The input terminals to AND gate 88 are respectively connected to the true output terminal of flip-flop T2, the clock 83 and the false input terminal of flip-flop F1 which, as will be more clearly understood below, functions to indicate whether or not the address loaded by external device 10 into address register 14 is in fact stored in address table 22. If the address is not stored in address table 22, flip-flop F1 at time $T_2$ is true. On the other hand, if the address is stored in address table 22, flip-flop F1 will be reset prior to time $T_2$.

The input terminals to gate 89 are respectively connected to the true output terminal of monostable circuit DL, the true output terminal of flip-flop F1, and the false output terminals of flip-flops T1, T2, and T3. Connected to the reset input terminal of monostable circuit DL is the output of AND gate 90. The input terminals of gate 90 are respectively connected to the true output terminal of flip-flop F1, the true output terminal of flip-flop T2, and the clock 83.

The output of AND gate 91 is connected to the reset input terminal of flip-flop T2. The input terminals of gate 91 are respectively connected to the true output terminal of flip-flop T2 and clock 83.

In order to understand the operation of the counter circuit, assume initially that flip-flop T1 is set and flip-flops T2 and T3 are reset. At the next pulse generated by clock 83, the output of AND gate 86 will be true thereby setting flip-flop T2 and resetting flip-flop T1. The next pulse generated by clock 83 will reset flip-flop T2 and in addition will set flip-flop T3 if flip-flop F1 is false. It will be recalled that flip-flop F1 will be false if the address loaded by external device 10 into address register 14 was in fact stored in address table 22. More particularly, the timing signal $T_3$ will occur 1μ second after the timing signal $T_2$ if the address table 22 stores the address loaded into the address register 14. If, on the other hand, the address is not stored in the address table 22, it is necessary that the main memory 16 be accessed. Accordingly, it is necessary for timing signal $T_3$ to be delayed 5μ seconds. In the event the address is not located in address table 22, flip-flop F1 will be true and accordingly will prevent the output of gate 88 from setting flip-flop T3. Instead, monostable circuit DL will be reset. As pointed out previously, the monostable circuit DL is stable in its set condition and when a reset pulse is applied thereto, assumes a reset condition for 5μ seconds. Accordingly, 5μ seconds after monostable circuit DL is reset by virtue of the signal derived from gate 90, the output of monostable circuit DL will come true. Inasmuch as flip-flop F1 is true at this time and each of flip-flops T1, T2 and T3 are false, gate 89 will provide a signal through gate 87 to set flip-flop T3. It should, therefore, be appreciated that if flip-flop F1 is false at time $T_2$, flip-flop T3 will be set .1μ second after time $T_2$. On the other hand, if flip-flop F1 is true at time $T_2$, flip-flop T3 will be set 5μ seconds after time $T_2$.

Attention is now called to FIG. 3(*c*) wherein the details of the memory system utilizing the major elements shown in FIG. 1(*a*) and operating in accordance with the flow diagram illustrated in FIG. 1(*b*) are shown. It is initially pointed out that it is assumed the memories utilized herein are of the nondestructive readout type. This assumption has been made in order to simplify the explanation by eliminating the requirement of restoring information in the memory subsequent to read out. It should be appreciated though, that the invention herein can be easily modified to operate with memories of the destructive readout type and in a practical installation, whether nondestructive readout or destructive readout is utilized will principally depend upon the cost considerations involved.

The external device 10 is connected to the address register 14 and adapted to load an address therein identifying a memory location in the main memory 16. The main memory 16 can be a conventional memory as illustrated in FIG. 2(*a*). Likewise, the fast memory 18 can be organized in a conventional manner but it is intended that the fast memory utilize extremely fast switching elements. The value table 20 and address table 22 are memories of the content addressable type illustrated in FIG. 2(*b*).

Although it should be clear that registers herein actually comprise several stages capable of storing several bits, as a rule for simplicity they will be shown as having one input terminal and one output terminal and it should be understood that the connections illustrated for the register would, in fact, have to be provided for each of the stages thereof. For example, AND gate 96 is illustrated as being connected to the output line of address register 14 while in fact gate 96 would be duplicated many times and connected to each of the memory elements in address register 14.

Inasmuch as portions of the equipment shown in FIG. 3(*c*) perform different functions at different times dependent upon the state of the counter of FIG. 3(*c*), it is not thought that any beneficial purpose would be served by initially discussing the various interconnections between the elements illustrated without discussing the functions performed. It is felt that a discussion intermingling a description of the circuit connections with the sequential states assumed by the counter of FIG. 3(*b*) will provide the reader with a quicker and more thorough grasp of the disclosed embodiment. Further, in order to additionally facilitate this manner of presentation, logical terms expressing the conditions under which certain signals occur are provided on the drawing.

In addition, a preliminary discussion of the nature of the value table and address table is in order. When operation of the entire memory system is initiated, the main memory, of course, will probably be full and the fast memory will be entirely vacant. Accordingly, the initial several accesses will be made from the main memory. An assumption is made that when particular information is accessed, it is more likely that this particular information will be accessed again in the next several accesses than other information. Based on this rational, the illustrated embodiment provides for accessing information from the main memory 16 and reading information into the fast memory 18 upon its initial access. When it is desired to access this information again, it will be available in the fast memory and thereby the overall speed of operation of the data processing apparatus is increased. In addition to writing the word accessed from the main memory 16 into the fast memory 18, the address identifying the main memory location from which the word was accessed is written into the address table 22 in a location associated with the fast memory location in which the word accessed from the main memory is stored. It will be apparent that if this procedure continues for some time, the fast memory 18 will soon become full. Accordingly, means are provided for displacing information from the fast memory 18 and replacing it with information more recently accessed from the main memory 16. In order to determine what information is to be displaced, the value table 20 is provided which stores value numbers indicating the value or importance or priority that the word in the associated fast memory location possesses. For simplicity and explanation, the embodiment shown in FIG. 3(*c*) provides only three memory locations in the fast memory and correspondingly three memory locations in each of the address table 22 and value table 20. Three value numbers (100, 010, 001) are defined with the value number 100 being defined as the highest order value number and the value number 001 being defined as the lowest order value number. Accordingly, whenever a new word from the main memory 16 is written into the fast memory 18 it is given a value number of 100. Each time a new word from the main memory 16 is written into the fast memory 18, all of the value numbers in the value table 20 are incrementally reduced by one such that a value number of 100 will be reduced, for purposes herein, to 010 and then to 001. Likewise, when a word is accessed from the fast memory 18, its value number will be raised to 100 and all of the value numbers previously above it will be reduced by one. Utilizing this value number system, the lowest valued word can be easily determined by searching the value table 20 for 001. Since the value table 20 comprises a content addressable memory, such a search can be performed in one access time.

Further reference is now made to FIG. 3(*c*) wherein at time $T_1$, as determined by the true state of counter flip-flop T1, the address in address register 14 is written into register C of address table 22 and the search input line thereof is energized. If the address is located in one of the locations in address table 22, a unique word line 80 associated therewith will be energized thereby setting one of the flip-flops L1, L2 or L3. Also, energization of one of the word lines 80 causes the output of OR gate 98 to become true thereby resetting flip-flop F1.

In addition to an address search being performed at time $T_1$, the valume number 001 is written into register B of the content addressable value table 20 and a search is performed to locate the value number corrresponding thereto. As a consequence, one of the word lines 80 of the value table 20 will be energized to in turn set one of the flip-flops H1, H2 or H3.

Initially assuming that the address was located in the address table 22 and that flip-flop F1 was thereby reset, at time $T_2$, the word in the memory location in the fast memory 18 associated with that flip-flop amongst flip-flops L1, L2 or L3 which is set will be read out into the E register of the fast memory 18. Since flip-flop F1 is false, the word in the E register will be read out through AND gate 98 at time $T_3$, occurring .1$\mu$ second after time $T_2$, to the output register 12.

Additionally at time $T_2$, the value number associated with the word read out from the fast memory 18 is read out into the B register inasmuch as a signal is applied to the read input line R of the value table 20. This value number information is utilized by comparing and incrementing logic 102 to incrementally reduce all members in the value table 20 having a value number greater than the value number associated with the word information read out from the fast memory 18. At time $T_3$, the highest order value number, 100, is written into the B register and in addition written into the value table location associated with the set flip-flop amongst flip-flops L1, L2 or L3.

Summarizing to this point, it should now be appreciated that if the address loaded by external device 10 into address register 14 appears in the address table 22, then the word in the location in the fast memory 18 associated with the address table location storing that address will be read out from the fast memory 18 and in addition, the value number information associated with that word will be raised to the highest order value number while all value numbers previously above it will be incrementally reduced by one.

Assume now that the address is not present in address table 22. Accordingly, flip-flop F1 will not be reset. Consequently, at time $T_2$ the address in register C will be read, through AND gate 103, into register D of the conventional main memory 16. Also at time $T_2$, reading of the main memory 16 will be initiated to access the word stored in the location identified by the address loaded into regitser D. .5$\mu$ second later, upon the occurrence of time $T_3$, the word is read out of register G through AND gate 104 to output register 12. It will be recalled that at time $T_1$, value table 20 was searched for the lowest order value number which, of course, indicates the most expendable word in the fast memory 18. As a consequence, one of the flip-flops H1, H2 or H3 was set accordingly energizing, through one of the AND gates 106 and OR gates 108, the memory elements of one of the locations in the fast memory 18 and in addition the memory elements of one of the locations in the address table 22. At time $T_2$, both the address and the word associated with the lowest order value number are read out into the C and E registers, respectively. At time $T_3$, the flip-flop $F_1$ being true, the contents of the C and E registers are respectively exchanged with the contents of the D and G registers through exchange means 110 and 112. As a consequence, the new word from the main memory 16, not previously in the fast memory 18, is now in the E register and the address identifying the main memory location from which it was accessed is now in the C register. Further, the word which had the lowest order value number is now in the G register and the address identifying the main memory location from which it was originally accessed is now in the D register. In addition to exchanging register information at time $T_3$, the exchanged information comprising the displaced word is written back into the main memory 16 and the new word and its associated address are respectively written into the fast memory 18 and the address table 22.

Also at time $T_3$, the highest order value number 100 is written into the B register and into the location in the value table associated with the fast memory location which formerly held the displaced word. The value table location is selected by the set flip-flop amongst flip-flops H1, H2 or H3. Additionally, the incrementing logic 102 functions to incrementally reduce all of the value numbers.

Reference is now momentarily made to FIG. 3(*d*) wherein the details of exchange means 110 are illustrated for exchanging information between flip-flops C1 and D1 of the C and D registers respectively. The true and false outputs of each of the flip-flops are respectively connected through AND gates 111 whose outputs are connected to OR gates 113 and thence to the set and reset input terminals of the opposite flip-flop. The AND gates act to exchange the information upon the occurrence of time $T_3$ if flip-flop $F_1$ is true. The unconnected inputs to OR gates 113 are used to read information into the flip-flops during operations other than the exchange operation.

It is pointed out that when the desired word is accessed from main memory 16, at time $T_3$ the word is provided to the output register 12 and in addition the lowest valued word from fast memory 18 is stored in main memory 16. With many presently available fast memory systems these two operations can be performed in the same time period. If the equipment is not capable of performing both operations on the same timing signal, an additional timing signal can be provided for the store operation.

As indicated, the details of implementation of each of the memories, i.e., the fast and main memories 18, 16 and value and address tables 20, 22 are conventional. The comparing and incrementing logic 102 can take any of several forms. As should be appreciated at this point, the function of the comparing and incrementing logic 102 is to ascertain the value number associated with the word read out from the fast memory 18 and incrementally reduce by one all value numbers in the value table 20 greater than the ascertained value number. In addition, it functions to incrementally reduce all of the value numbers in the value table 20 when any word from the main memory 16 is written into the fast memory 18. Any of several techniques can be employed to accomplish the comparison and incrementing function stated. For example, the elements of each of the locations in the value table can be connected together so as to comprise a counter circuit whereby a single pulse applied to the circuit can cause the counter to count down to thereby incrementally reduce the value number stored therein by one. Straightforward digital techniques can be employed to compare the value number read out into the B register at time $T_2$ with the value number stored in the value table locations so that only those locations storing value numbers greater in magnitude than the value number in the B register will receive the count down pulse.

Other schemes for performing the comparing and incrementing functions are available. For example, depending upon the size of the fast memory 18 utilized, it can prove economically advisable to provide special purpose logic circuitry which incorporates the functions of the value table 20 and incrementing logic 102 into one unit. For example, FIG. 4 illustrates just such a special purpose logic circuit designed to perform all of the functions of the value table 20 comparing and incrementing logic 102 for three fast memory locations. In considering the ensuing discussion of the logic circuit of FIG. 4, the reader may become aware of certain gate inputs which appear to be superfluous. These superfluous gate inputs have been utilized in order to make this special purpose circuitry compatible with the signals pointed out in the general case in FIG. 3(*c*). In other words, no concerted effort has been made to simplify the logic circuit of FIG. 4 to economically optimize it. More concern has been given to simplifying it to facilitate an appreciation of how the value table 20 and the comparing and incrementing logic 102 can be implemented.

The circuit of FIG. 4 includes three memory locations each including three memory elements which comprise conventional set-reset flip-flops. The flip-flops of the first location will be designated V11, V12, V13, the second location V21, V22, V23 and the third location V31, V32, V33. Inasmuch as the logical gates associated with the memory elements of each location are identical, particular attention in the ensuing description will be paid to location No. 1. Input/output register means connected to the memory elements of the locations comprise flip-flops B1, B2, and B3 and associated gating circuitry. Since it is again not thought beneficial to discuss the circuit details by themselves without reference to the timing signals and functions performed by the circuit, the circuit description and functional description of the circuit operation will be intermingled as was done in the description of FIG. 3(*c*).

The value number system employed by the logic circuit of FIG. 4 will be the same as that previously mentioned; i.e., a value number of 100 (B3 true, B2 and B1 false) will be considered the highest order value number while the value number 001 will be considered the lowest order value number.

Recall that at time $T_1$ it is desired to search locations Nos. 1, 2 and 3 to determine in which location the lowest order value number is stored. Accordingly, at time $T_1$ flip-flop B1 is set via OR gate 111 and a pulse is applied to the search line 113. The true output terminal of B1 and the search line 113 comprise inputs to AND gates 114. Each of the AND gates 114 is additionally connected to the true output of the first stage flip-flop of a unique location. Consequently, the AND gate 114 associated with the location storing the value number 001 will provide a true output thereby setting one of the flip-flops H1, H2, H3 in accordance with the procedure previously described in conjunction with FIG. 3.

It will be further recalled that if the address stored in address register 14 by external device 10 was located in address table 22, then flip-flop F1 was reset and the word in the fast memory location associated with the location in which the address was stored in the address table was read out into the E register. It is also desired at time $T_2$ to read out the value number information associated with that word. In order to do this, a unique location select line 117 in FIG. 4 is made true as determined by which one of the flip-flops L1, L2 or L3 had been set. Accordingly, when the read line 115 in FIG. 4 goes true, the contents of the memory elements of the selected location will be read out through AND gates 116, 118 and 120, respectively, connected to the first, second and third stage memory elements, through OR gates 122, 124 and 126 and thence through AND gates 128, 130 and 132 into the stages of the B register comprising memory elements B1, B2 and B3.

The memory elements of each location in FIG. 4 are interconnected so as to comprise a counter. For example, if flip-flop V13 is true, and flip-flops V12 and V11 are false, application of a true signal to line 134 causes the output of AND gate 136 to go true thereby setting flip-flop V12 and resetting flip-flop V13. Similarly, if flip-flop V12 is true, and a true signal is applied to line 138, the output of AND gate 140 will go true thereby setting flip-flop V11 and resetting flip-flop V12 through OR gate 142.

It will be realized that if the value number 010 is associated with the word read out from the fast memory 18, then only the value number 100 need be incrementally reduced. On the other hand, if the value number associated with the word read out from the fast memory is 001, then both the value numbers 100 and 010 need be incrementally reduced. Consequently, at time $T_2$, if flip-flop F1 is false, and if the outputs of either AND gate 128 and AND gate 130 are true, line 134 will become true. On the other hand, line 138 will become true only if the output of AND gate 128 is true. By this technique, after time $T_2$, the value number 100 will not be stored in any of the memory locations. The logical expressions dictating under what conditions lines 134 and 138 become true are indicated in FIG. 4 wherein the symbols X and Y have been introduced to simply represent the outputs of gates 130 and 128, respectively.

At time $T_3$, flip-flops B1 and B2 are reset and flip-flop B3 is set via OR gate 145. The true output of flip-flop B3 is connected as an input to each of AND gates 144 together with write line 146 to which is applied the true output of flip-flop T3. The third input to each of the AND gates 144 comprises a unique location select line 117. As previously discussed in connection with FIG. 3(*c*), at time $T_3$, if flip-flop F1 is true, a signal will be applied to one of the location's select lines 117 in accordance with which one of the flip-flops H1, H2 or H3 has been set. On the other hand, if flip-flop F1 is false at time $T_3$, the location select line 117 will be chosen on the basis of which one of the flip-flops L1, L2 or L3 is set. Accordingly, the value number 100 will be written into the selected value table location by virtue of the fact that the output of each of the AND gates 144 is connected to the set input terminal of the third stage flip-flop with which it is associated, e.g., V13. Additionally, the output of the AND gate 144 is connected to the reset input terminals of the second and first stage flip-flops, e.g., V12, V11, of the location with which it is associated.

Accordingly, the manner in which the circuit of FIG. 4 operates to perform the value number storage, value number comparison and incremental reduction functions should now be appreciated. As previously stressed, other distinctly different circuits could be utilized.

From the foregoing, it should be readily appreciated that an improved memory system has been disclosed herein which tends to maximize the frequency of usage of the fastest memory in a memory system employing a hierarchy of memories. It is appreciated that several modifications of the disclosed embodiment falling within the scope of the invention as recited in the appended claims will readily occur to persons skilled in the art. For example, one such modification might be to load the address information from the address register 14 into the D register simultaneously with its insertion to the C register thereby permitting the main memory search to be initiated at the same time the fast memory search is initiated. Then, if the desired information was located in the fast memory, the main memory search can be aborted. Although such a technique may be desirable in certain situations, dependent upon the relative speeds of the two memories, it is likely not to be beneficial, in the light of cost considerations in most applications.

The value number system introduced herein is exemplary only and it should be readily appreciated that a significantly different value number approach could be employed. More particularly, it is not essential that a unique value number be associated with the information in each of the various fast memory locations. Instead a system of levels of value numbers, that is where several words have the same value number could be utilized. Also, in a large system it is recognized that it would be more economical to code the value numbers as, for example, into a binary code so that three flip-flops can be utilized to represent eight unique value numbers rather than three.

Additionally, it should be recognized that applicant has herein suggested a simple criteria for modifying the value numbers and for determining which information should be brought into the fast memory and which information should be displaced therefrom. Experience has indicated that more complex criteria may actually be desired. For example, assuming momentarily that the capacity of the fast memory is 10 words, utilizing the simple gravity feed type criteria disclosed herein, a word will be displaced from the fast memory 18 if it is not accessed as 10 new words are brought from the main memory 16. This simple gravity feed type criteria does not take into account the past history of the word and it may be desirable to do so. For example, let us assume that a particular word is accessed only every third access for a series of 100 accesses and then it is not accessed for 10 accesses. It may be desirable to increase its value number on the basis of its history over the past 100 or so accesses rather than merely on the basis of the past 10.

It will be noted that the disclosed embodiment provides for always replacing the word displaced from the fast memory 18 into the main memory 16. Unless the word is altered while in the fast memory 18, this replacement procedure is, of course, unnecessary inasmuch as the word was not erased in the main memory 16 when it was originally accessed therefrom. In order to avoid replacing all of the information displaced from the fast memory 18 into the main memory 16, a spare bit can be associated with the word information to indicate whether or not it was altered while in the fast memory 18 and replacement can be initiated only if such alteration took place.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. For use in a data processing system, a memory system comprising:

an output register;

a first memory having a relatively large number of word storage locations therein, each identifiable by a different digital address;

a second memory having a relatively small number of word storage locations therein;

a third memory including a plurality of storage locations therein each of which is associated with one of said locations in said second memory;

means storing a digital address in each of said third memory storage locations identifying the first memory storage location storing the word information stored in the associated second memory storage location;

external means adapted to generate a digital address identifying one of said first memory storage locations;

means responsive to said external means for transferring to said output register, word information from the second memory storage location associated with the third memory storage location storing said generated digital address and for transferring to said output register word information from the first memory storage location identified by said digital address in the event said digital address is not stored in said third memory; and means responsive to said word information being transferred from a first memory storage location for storing said word information in a second memory storage location and the digital address identifying said first memory storage location in the third memory storage location associated with said second memory storage location.

2. The memory system of claim 1 wherein said third memory comprises a content addressable memory thereby permitting all of the storage locations therein to be searched simultaneously for the presence of said address information generated by said external means.

3. The memory system of claim 2 wherein said third memory includes a plurality of word match lines each uniquely associated with one of the storage locations therein and means for energizing a word match line when the information stored in the location associated therewith is identical to said address information generated by said external means; and means connecting each of said word match lines to said second memory for causing the word information in the second memory location associated therewith to be read out into said output register.

4. For use in a data processing system, a memory system comprising:

a first memory having a relatively large number of word storage locations therein;

a second memory having a relatively small number of word storage locations therein;

a third memory including a plurality of storage locations therein each of which is associated with one of said locations in said second memory;

a fourth memory including a plurality of storage locations therein each of which is associated with one of said locations in said second memory;

external means adapted to generate address information identifying one of said first memory storage locations;

means for accessing word information from said second memory if the word information stored in said identified first memory storage location appears in said second memory and for accessing said word information from said first memory if said word information is not stored in said second memory;

means for automatically storing said word information in said second memory when said first memory is accessed;

means for storing value number information in said third memory storage locations and for incrementing the value number information in each of said locations in response to whether or not the word information associated therewith is accessed; and means for storing address information in each of said fourth memory storage locations identifying the first memory storage locations from which the word information stored in the associated second memory storage location was accessed.

5. The memory system of claim 4 wherein said third and fourth memories comprise content addressable memories thereby permitting all of the storage locations in each to be searched simultaneously for the presence of unique value number information and said address information respectively.

6. For use in a data processing system, a memory system comprising:

a first memory having a relatively large number of word storage locations therein;

a second memory having a relatively small number of word storage locations therein;

a third memory including a plurality of storage locations therein each of which is associated with one of said locations in said second memory;

a fourth memory including a plurality of storage locations therein each of which is associated with one of said locations in said second memory;

external means adapted to generate address information identifying one of said first memory storage locations;

means for accessing word information from said second memory if the word information stored in said identified first memory storage location appears in said second memory and for accessing said word information from said first memory if said word information is not stored in said second memory;

means for storing value number information in said third memory storage locations and for incrementing the value number information in each of said locations in response to whether or not the word information associated therewith is accessed;

means for storing address information in each of said fourth memory storage locations identifying the first memory storage locations from which the word information stored in the associated second memory storage location was accessed; and means for automatically storing said word information in said second memory and the corresponding address information in said fourth memory when said first memory is accessed.

7. For use in a data processing system, a memory system comprising:

a first memory having a relatively large number of word storage locations therein;

a second memory having a relatively small number of word storage locations therein;

a third memory including a plurality of storage locations therein each of which is associated with one of said locations in said second memory;

external means adapted to generate address information identifying one of said first memory storage locations;

means for accessing word information from said second memory if the word information stored in said identified first memory storage location appears in said second memory and for accessing said word information from said first memory if said word informtion is not stored in said second memory;

means for automatically storing said word information in a vacant second memory storage location if a location is vacant when said first memory is accessed;

means for generating a highest value number and storing it in a third memory storage location associated with the second memory storage location in which the most recently accessed word information is stored;

means for incrementally reducing each of said value numbers when said first memory is accessed or when word information in said second memory having a lower value number associated therewith is accessed; and means for determining the lowest value number and storing said word information in the second memory storage location associated therewith when said first memory is accessed and no second memory storage location is vacant.

8. The memory system of claim 7 wherein said third memory comprises a content addressable memory.

9. The memory system of claim 7 wherein said means for accessing word information includes circuit means for generating a first timing signal if the word information stored in said identified first memory storage location appears in said second memory and for delaying said first timing signal if said word information is not stored in said second memory.

10. For use in a data processing system, a memory system comprising:

a first memory having a relatively large number of word storage locations therein;

a second memory having a relatively small number of word storage locations therein;

a third memory including a plurality of storage locations therein each of which is associated with one of said locations in said second memory;

a fourth memory including a plurality of storage locations therein each of which is associated with one of said locations in said second memory;

external means adapted to generate address information identifying one of said first memory storage locations;

means for accessing word information from said second memory if the word information stored in said identified first memory storage location appears in said second memory and for accessing said word information from said first memory if said word information is not stored in said second memory; and means for automatically storing said word information in a vacant second memory storage location if a location is vacant and for storing corresponding address information in a vacant fourth memory storage location if a location is vacant when said first memory is accessed.

11. The memory system of claim 10 wherein said third and fourth memories comprise content addressable memories.

References Cited by the Examiner

UNITED STATES PATENTS

| | | | |
|---|---|---|---|
| 3,093,814 | 6/1963 | Wagner et al. | 340—172.5 |
| 3,208,048 | 9/1965 | Kilburn et al. | 340—172.5 |

ROBERT C. BAILEY, *Primary Examiner.*

R. M. RICKERT, *Assistant Examiner.*